Nov. 6, 1973  R. R. AYERS  3,770,626
SORBENT BELT
Filed Oct. 26, 1971
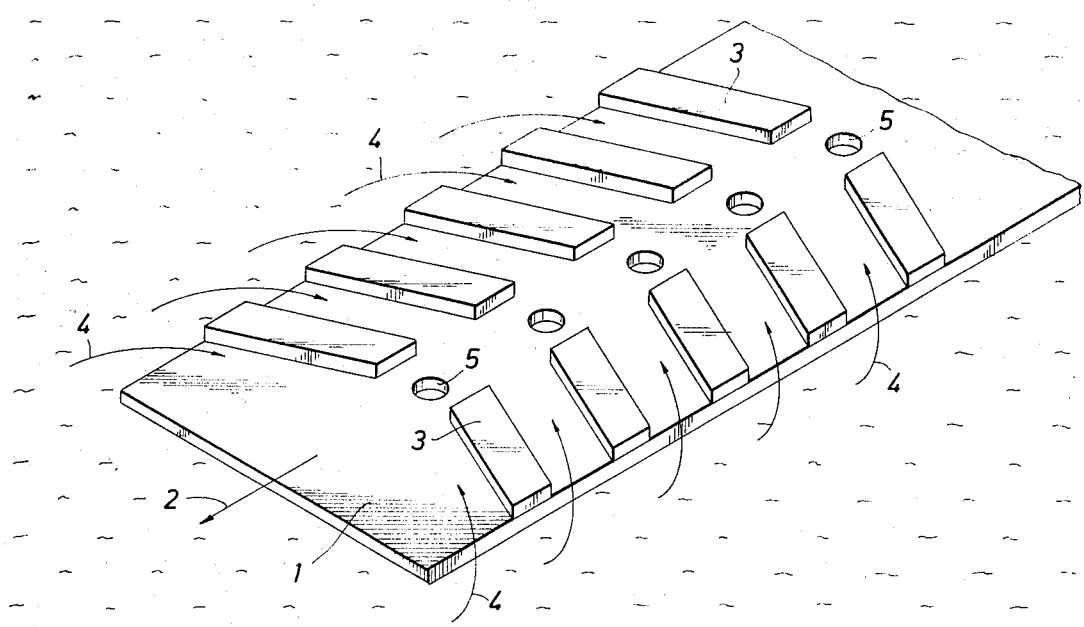

3,770,626
SORBENT BELT
Ray R. Ayers, Houston, Tex., assignor to Shell Oil Company, New York, N.Y.
Filed Oct. 26, 1971, Ser. No. 192,429
Int. Cl. B01d 33/14; E02b 15/04
U.S. Cl. 210—40
9 Claims

ABSTRACT OF THE DISCLOSURE

Apparatus and method for removing a polluting liquid from a water surface, the apparatus being composed of a sorbent body shaped to form free flow paths which move the pollutant into increased contact with the sorbent body; the method involving a sorbent body shaped to form free flow paths and moving the sorbent body through the water to cause the pollutant to flow in the free flow paths to increase contact with the sorbent body.

BACKGROUND OF THE INVENTION

Over most of the navigable waters of the world during recent years oil spills have become problems of great seriousness; oil tankers wrecked at sea have spilled large volumes of oil into the water near beaches and harbors. In addition, leaky fittings and ruptured hoses at shipping terminals and refineries have caused major oil spills in various harbors. As a result, considerable efforts by many parties have been devoted to developing various means to control oil spills. However, such efforts have to date been only modestly successful.

One method employed by the prior art involves use of an endless sorbent belt. The method requires continuously revolving the belt into contact with the oil spill and removing the oil from the belt into a container. Pollutant is imbibed by the belt almost exclusively through porous flow in which surface tensions predominate. Such belts therefore have to be generally quite long in order to provide adequate residence time for absorption/adsorption not only because of slow porous flow but further because of the relatively low surface area per unit mass of the belt. Even further, pollutant tends to be pushed away from the belt by a wake or ripples generated by the belt being moved through the water, thereby making the belt even less efficient. Consequently, the prior art has not been successful in supplying a reasonably good sorbent belt system.

The present invention overcomes the above described difficulties and provides a successful solution to the problems of the prior art, as will be apparent from the following description thereof.

SUMMARY OF THE INVENTION

The primary purpose of this invention resides in providing an apparatus for the recovery of pollutant spills which can be employed under a wide range of ambient conditions by a method which efficiently removes the spill.

The above purpose has been achieved through the utilization of a sorbent body which, on being moved through the water, pulls the pollutant toward the body so that it may be sorbed.

The apparatus of this invention broadly extends to a sorbent body defining integral free flow paths which deflect the pollutant into increased contact with the sorbent body.

The method of this invention broadly extends to providing a sorbent body defining integral flow paths which deflect the pollutant into increased contact with the sorbent body, and moving the sorbent body through the water to cause the pollutant to flow in the free flow paths.

Within the framework of the above described method and apparatus, the present invention not only solves the above mentioned problems of the prior art, but also achieves further significant advantages as will be apparent from the description of preferred embodiments following.

BRIEF DESCRIPTION OF THE DRAWINGS

In the drawings an isometric view shows a belt having a chevron arrangement of sorbent blocks being moved through a pollutant spill on water.

DESCRIPTION OF THE PREFERRED EMBODIMENTS

The recovery of a pollutant spill with an endless belt appears to have excellent potential. Thus, the pollutant is continually sorbed by the belt and/or by its attached sorbents and removed therefrom by a relatively simple operation. In addition, the belt can be employed under a wide range of weather conditions, the only limiting factor being weather too rough for the use of vessels transporting the endless belt. However, as above noted, the endless belt system does suffer some drawbacks. Thus, conventional endless belts have a tendency to form a wake or ripples which keeps the pollutant away from the belt. However, the present invention overcomes this and other drawbacks. The essence of the invention resides in the utilization of free flow paths which divert pollutant flow into greater contact with the sorbent body being employed. The advantages over the prior art of the sorbent bodies of this invention, particularly when in the shape of sorbent belts, are readily apparent. With conventional belts there is great difficulty in getting the pollutant to the belt so that it may be sorbed, the belt already being limited by a relatively low surface area per unit mass of the belt which is necessitated by the combined wringing/pulling techniques which require that the belt cross-section be compact. By comparison, the belts of the present invention are superior to such conventional belts since, (1) the configuration of the belt provides free flow paths which pull the pollutant to the belt thereby reducing the area to be covered by the belt, (2) the free flow paths propel the pollutant into more intimate contact with the sorbent so that the pollutant is more efficienly removed, and (3) the pollutant is imbibed in a shorter residence time because the oil reaches the interior of the belt by free flow, in which surface forces do not predominate, to increase the sorption rate. Free flow, or channeled open flow, is possible where the belt structure allows natural current forces to predominate over surface tension forces which favor porous flow. The present invention is an improvement over the "sorption only" continuous belt of the prior art inasmuch as the belt of this invention allows the combination of channeled open flow and porous flow to increase sorption rate.

Referring to the figure of the drawings, there is shown a sorbent body deployed on a pollutant spill on a water surface. It will be understood, of course, that the present invention broadly extends to all floating liquid pollutant, oil or other, and is particularly useful in control of pollutants floating on the ocean. Belt 1 is passed through the pollutant spill in direction 2 as shown by the arrow. A chevron arrangement of sorbent blocks 3 direct the pollutant and some water in the direction shown by arrows 4. Excess fluid is ejected downward at the center of the belt through orifices 5. The channels thus formed by blocks 3 provide quicker, non-porous flow to the sorbent material on the belt.

It is of course apparent that other arrangements of the above-noted channels will accomplish the desired result. For example, an alternate arrangement is where the sorbent blocks are all at one angle to allow cross flow. Also, while the sorbent blocks are shown as being rectangular bars, other shapes are suitable, for example, curvilinear, without departing from the scope of the invention.

In the preferred embodiment of the invention shown in the figure of the drawings, the belt serves as a tension member for pulling the sorbent blocks through the floating pollutant and has no sorptive function of its own. Alternatively, the belt also may be a sorbent in addition to the sorbent blocks which are affixed to the belt, whereby the blocks improve sorption of the belt. While the sorbent blocks are shown attached only to one face of the belt, the blocks also may be attached to both faces.

It is preferred that the belt be in the form of a continuous loop, but the belt may be of a finite length and be pulled through the water by a transporting means. If towed in such a fashion, it is evident that more than one belt may be employed so that failure of one belt will not constitute failure of the complete system.

Of course, the invention need not be employed solely with belts. Thus, the invention may be employed with any body or device wherein it is desired to direct flow of the pollutant toward the body or device rather than allowing the body or device to create a wake and repel the pollutant.

Once the pollutant has been sorbed by the sorbent body, it may be extracted by conventional means, for example by being pulled between a series of rotatable parallel cylinders or rollers (not shown) which are spaced consecutively closer together so that pollutant is gradually removed over an extended squeezing period, thereby reducing pore pressure generated by the squeezing action which might otherwise damage the belt. Alternatively, the squeezing means may be a pair of endless belts (not shown) each rotatable around a series of cylinders and mutually arranged in such a way that a slot-shaped passage of decreasing height is left through which the sorbent body to be squeezed is passed. Preferably, the cylinders or the pair of endless belts are such that the sorbent is squeezed up to at most two-thirds of maximum squeezing capacity. By restricting the squeeze pressure so that not all of the sorbed pollutant is recovered, damage to the porous body is reduced which lengthens the period in which such a body can be used without being replaced. It is, of course, evident that other means can be employed to remove pollutant from the sorbent body which are equally as good as that above discussed. Thus, the pollutant can be removed by wringing, by the use of solvents, or combinations of squeezing, wringing, and solvent removal.

Where the sorbent body is in the form of or attached to an endless belt, it is preferably deployed on the open sea by two vessels. However, it is to be understood that the invention is adaptable to collecting pollutant from a waterway, such as a river, where it may be convenient to substitute a shore installation for one or both vessels. It is, of course, possible to make use of two vessels on a waterway as in the open sea.

It is also possible to use a collecting barge and a guiding boat instead of two boats each collecting the pollutant. In some cases it may be possible to use only one boat, without a barge or shore installation, where the sorbent body can be spread over the water surface by wind and/or currents.

Preferably, the sorbent of this invention has an average porosity of at least about 80 percent and a density of less than about 1 so that it will float on water. Of course, it is not necessary that the sorbent float as special means known to the art may be provided to keep it from sinking. Preferably, however, a foamed organic polymer is employed which easily floats. Foamed polyurethane is the most preferred material, while urea formaldehyde resin is attractive for some purposes.

The apparatus and method of the invention may be used for any purpose in cases where a pollutant liquid floating on water is to be recovered. The present method, while directed principally to dealing with large scale oil pollution, may also be used in skimming oil from oil field and refinery drains.

I claim as my invention:

1. An apparatus for removing a floating liquid pollutant from water, comprising a belt and a sorbent body having integral free flow paths formed by ridges of the sorbent body which extend from said belt, said ridges being constructed and arranged on said belt so that when the belt is moved over the water the pollutant will be deflected into increased contact with the sorbent body.

2. The apparatus of claim 1 wherein the free flow paths are directed away from the edges and along the surfaces of the sorbent body.

3. The apparatus of claim 1 wherein the ridges are in a chevron arrangement.

4. The apparatus of claim 3 wherein the belt is an endless loop.

5. The apparatus of claim 1 wherein the belt has centrally located orifices for removing excess pollutant and water.

6. A method for removing a floating liquid pollutant from water, comprising:
   providing a belt and a sorbent body having integral free flow paths formed by ridges of the sorbent body which extend from said belt, said ridges being constructed and arranged on said belt so that when the belt is moved over the water the pollutant will be deflected into increased contact with the sorbent body, and
   moving the sorbent body through the water to cause the pollutant to flow in the free flow paths.

7. The method of claim 6 wherein the sorbent body is attached to a belt which is towed.

8. The method of claim 6 wherein the sorbent body is attached to an endless loop belt which is revolved.

9. The method of claim 6 wherein the pollutant is directed by the free flow paths toward the center of the belt and excess pollutant and water are ejected downward at the center of the belt through orifices.

References Cited
UNITED STATES PATENTS

| | | | |
|---|---|---|---|
| 3,669,275 | 6/1972 | Downs | 210—242 |
| 3,668,118 | 6/1972 | Rhodes | 210—30 |
| 3,679,058 | 7/1972 | Smith | 210—242 |
| 3,556,301 | 1/1971 | Smith | 210—242 |
| 2,888,143 | 5/1959 | Seidenstricker | 210—525 |

SAMIH N. ZAHARNA, Primary Examiner

R. H. SPITZER, Assistant Examiner

U.S. Cl. X.R.

210—242, 400, DIG. 21